United States Patent [19]

Falbel

[11] Patent Number: 5,079,419

[45] Date of Patent: Jan. 7, 1992

[54] HORIZON SENSOR COMPENSATION FOR RADIANCE VARIATIONS

[75] Inventor: Gerald Falbel, Stamford, Conn.

[73] Assignee: EDO Corporation, Barnes Engineering Div., Shelton, Conn.

[21] Appl. No.: 534,448

[22] Filed: Jun. 6, 1990

[51] Int. Cl.$^5$ ............................................. G01J 5/06
[52] U.S. Cl. .............................. 250/338.1; 250/342; 250/347; 250/349
[58] Field of Search .............. 250/349, 347, 340, 342, 250/338.1

[56] References Cited

U.S. PATENT DOCUMENTS

| | | | |
|---|---|---|---|
| 3,486,024 | 12/1969 | Astheimer | 250/338.1 |
| 3,551,681 | 12/1970 | Astheimer | 250/349 |
| 4,785,169 | 11/1988 | Gontin | 250/342 |

*Primary Examiner*—Carolyn E. Fields
*Attorney, Agent, or Firm*—Parmelee, Bollinger & Bramblett

[57] ABSTRACT

A horizon sensor scans an infrared detector over the earth's horizon generating first (A) and second (B) signals of finite pulse width representing radiation from the fields of view of the infrared detector as it is scanned across the earth's horizon. Signals (A−B) and (A+B)/3 are derived from the first (A) and second (B) signals. The horizon is detected when a threshold is exceeded when the absolute value (A−B) is less than the absolute value of (A+B)/3 whereby the detected horizon is essentially independent of the radiance variations of the earth's horizon. Sun and moon signals appearing in the field of view of the infrared detector are eliminated based on the smaller pulse width of such signals in comparison with the finite pulse width of the first and second signals. The method of radiance compensation can be implemented using a dual field of view for the infrared detector in a horizon crossing indicator sensor where the scanning of the detector is provided by the rotation of the satellite. In another embodiment, wherein the scanning of a single field of view is provided by a conical scanner in the sensor, the signal is digitized and delayed to provide the dual fields of view in which the horizon is detected in the same manner as the embodiment using two separate detectors with similar beneficial results.

9 Claims, 4 Drawing Sheets

|  | START (DEG.) | INDICATED CROSSING (DEG.) | INDICATED LE-THRESH (DEG.) |
|---|---|---|---|
| SUN | −14.960 | −12.371 | 2.589 |
| RISING EARTH | −5.600 | −0.576 | 5.024 |
| FALLING EARTH | 12.400 | 16.741 | 4.341 |

FIG. 4

HORIZON SENSOR COMPENSATION FOR RADIANCE VARIATIONS

BACKGROUND OF THE INVENTION

This invention relates to horizon sensors, and more particularly to a method and apparatus for compensating for radiance variations of the earth's horizon.

Horizon sensors are devices which are mounted in satellites, space probes and the like which sense the earth's horizon and produce signals which indicate orientation of the satellite with respect to the earth. The signals are derived by scanning an infrared detector over the earth's horizon which is extremely warm compared to cold outer space generating a signal on such crossings used along with reference signals as the scan passes predetermined points in the orbit of the orbiting space craft. The intervals between the horizon crossings and the reference pulses are used to produce an output signal providing attitude information of the orbiting body with respect to the earth. The infrared detector is sensitive to radiation from the carbon dioxide band in the 14-16 micrometer range because of the uniformity of the horizon profile over all atmospheric conditions. However, radiation from the earth is not uniform and varies depending on the month of the year and location of the scanning pattern which if not corrected or considered will produce errors in locating the true horizon. Accordingly, compensation must be provided for radiation variations in order to improve the accuracy of the horizon sensor. This is true whether the scanning is being done by the satellite itself which rotates in orbit and scans an infrared detector mounted thereon across the horizon as it rotates in orbit around the earth or a rotating optical element is mounted onto the satellite and scans the detector across the horizon. For example, in U.S. Pat. No. 3,020,407 a rotating optical prism scans the infrared detector in a conical scan pattern across the horizon to derive the electrical output signals marking the line of thermal discontinuity between cold outer space and the warm earth. In addition, the earth's horizon must be distinguished from other celestial objects such as the sun or the moon which also generate signals if they appear in the scanning pattern of the infrared detector. Accordingly, many such horizon sensors use a separate detector or means for eliminating the effects of the sun so that false horizon indications will not occur.

SUMMARY OF THE INVENTION

Accordingly, it is an object of this invention to provide a new and improved method and apparatus for improving the accuracy of horizon sensors.

Another object of the present invention is to provide a new method and apparatus for providing compensation for radiance variations across the earth's surface in order to improve the accuracy of horizon sensors.

Still a further object of this invention is to provide a new and improved method and apparatus which compensates for radiation variances on the earth independent of the speed of the scan of the horizon crossing indicator type horizon sensors.

Another object of this invention is to provide a new and improved horizon sensor which provides compensation with a significant simplification of the number of electronic components required to perform the same functions achieved in previously implemented horizon crossing indicators as well as significantly improving the accuracy in the presence of earth radiation variations in the 14-16 micrometers atmospheric carbon dioxide emission band.

In carrying out this invention in one illustrative embodiment thereof, a method is provided for compensating for radiance variations on the earth's scan by a horizon sensor for identifying the earth's horizon which comprises the steps of scanning the earth's horizon with an infrared detector, generating first (A) and second (B) signals of finite pulse width representing radiation from fields of view of infrared detector means on crossings of the earth's horizon, deriving (A−B) and (A+B)/3 signals from said first (A) and said second (B) signals, and detecting the horizon when a threshold is exceeded when the (A−B) signal is less than the (A+B)/3 signal whereby the detected horizon is essentially independent of the radiance variations of the earth's horizon.

This method is applicable to horizon crossing indicator sensors in which the infrared detector means has a leading/ following dual field of view which is scanned across the earth's horizon by the rotation of the orbiting satellite around its spin axis, as well as to a motor-driven, rotating scanner mounted on a three-axis-stabilized space craft which scans a single field of view across the earth's horizon. The signal generated from the single field of view detector is digitized, stored in memory and is reread in time delay for a period equivalent to one field of view angular traverse in space to in effect create the same relationships namely, (A−B) and (A+B)/3 as in the horizon crossing indicators dual field.

BRIEF DESCRIPTION OF THE DRAWINGS

The invention, together with further features, objects advantages and aspects thereof will be more clearly understood from the following description taken in connection with the accompanying drawings.

FIG. 4 is a table indicating the summary of results of the present invention which are indicated on the graph of FIG. 3.

DESCRIPTION OF THE PREFERRED EMBODIMENTS

Some satellites are attitude stabilized by causing such satellites to spin around a predetermined axis. Such satellites or space craft usually employ infrared sensors to determine the orientation of the satellite spin axis with respect to the earth. One frequently used is an infrared horizon crossing indicator (HCI) which uses a narrow field directed from the space craft at some angle with the spin axis of the space craft. The HCI scans a great circle in space around the spin axis by the rotation of the satellite and produces pulse signals from the radiation in the field of view of the infrared detectors as the HCI crosses the earth's horizon. The phase and interval between crossings provides attitude information.

Figure 1:
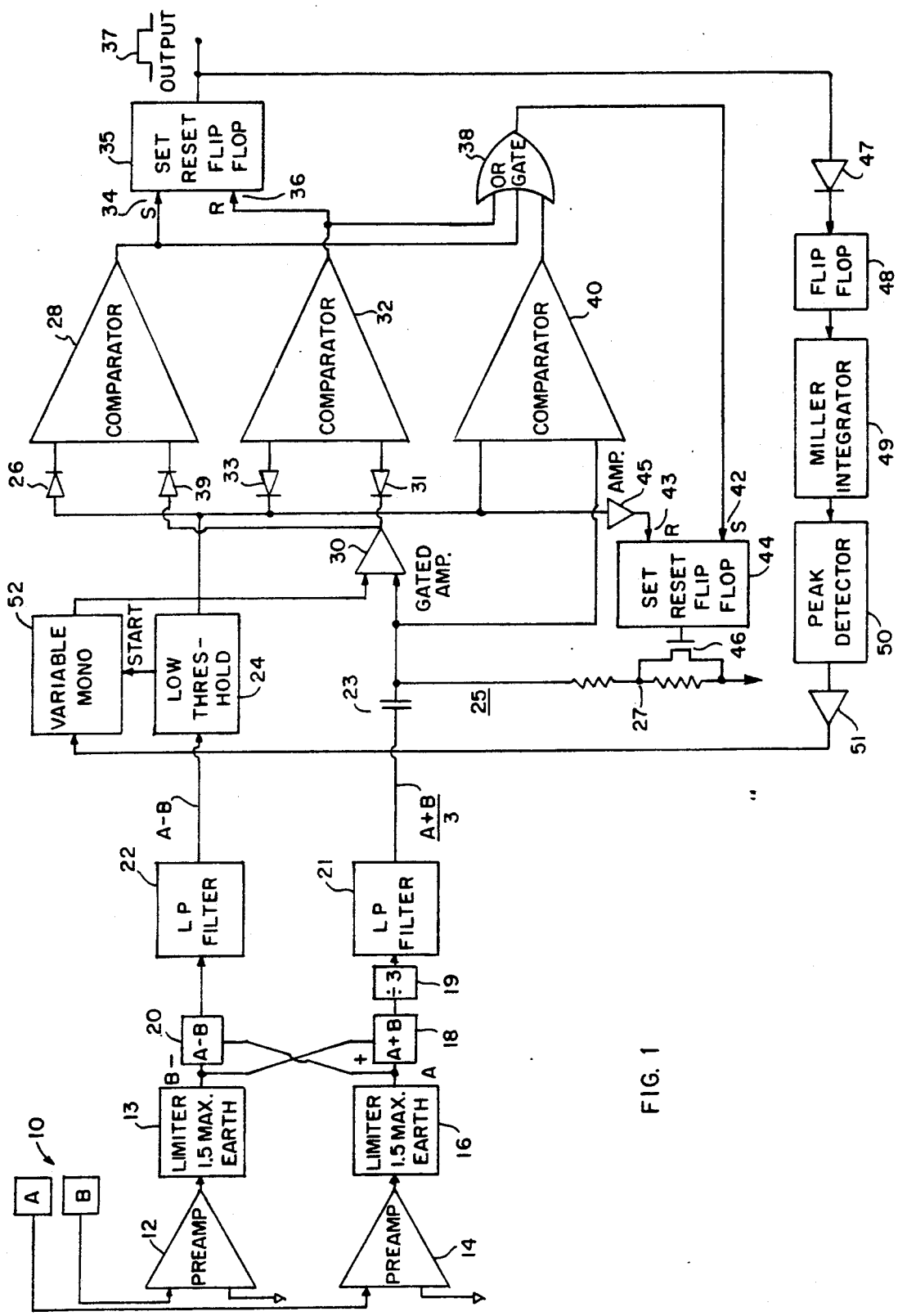
FIG. 1 is a block diagram of one embodiment of a horizon crossing indicator type horizon sensor which is illustrative of the overall method in accordance with the present invention.
Figure 2:
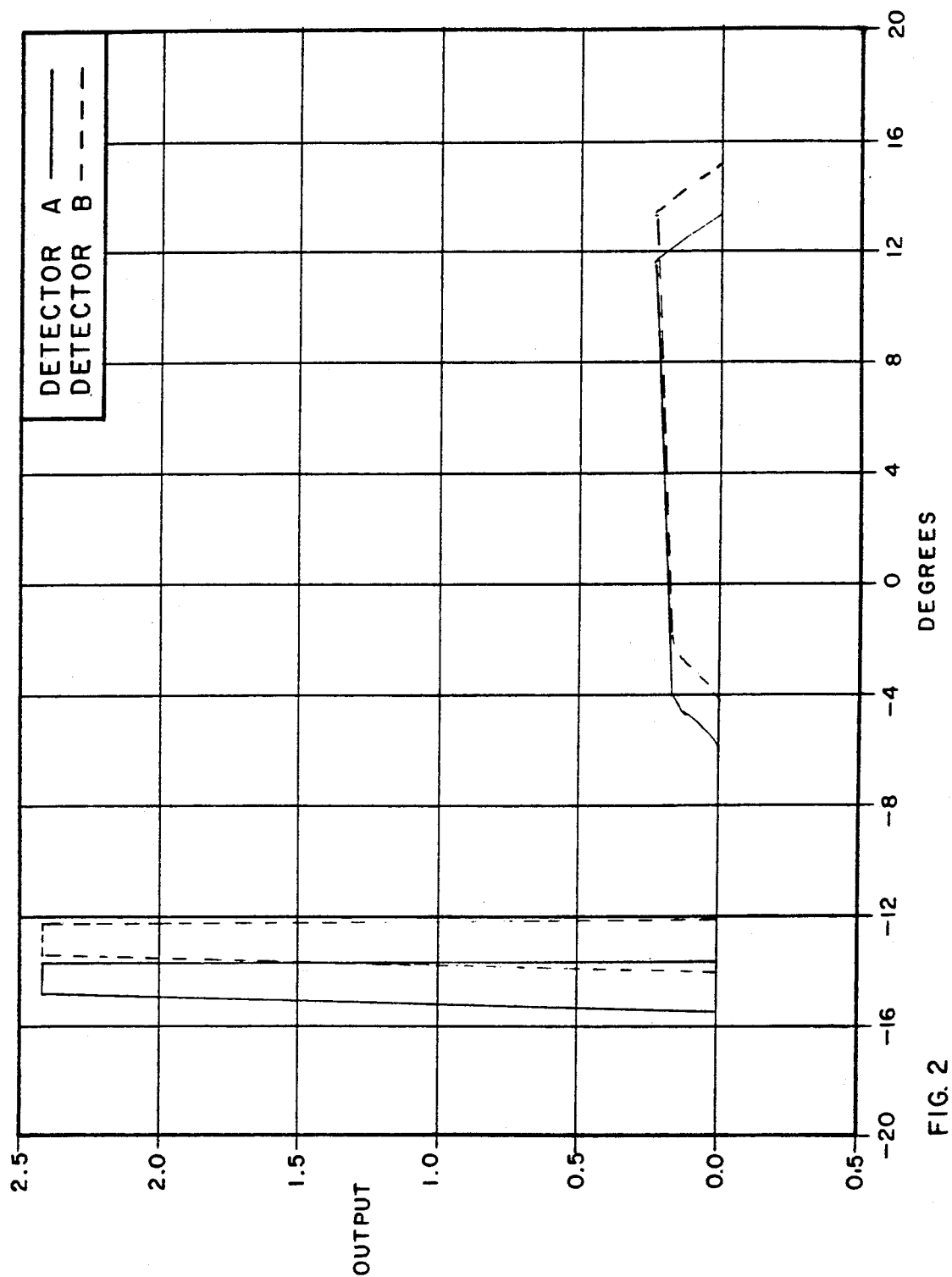
FIG. 2 illustrates a graph of output vs. degrees (scan) for the signals obtained from the two detector elements A and B shown in FIG. 1 when scanned across the sun and then the earth by a horizon crossing indicator mounted on an orbiting satellite.
Figure 3:
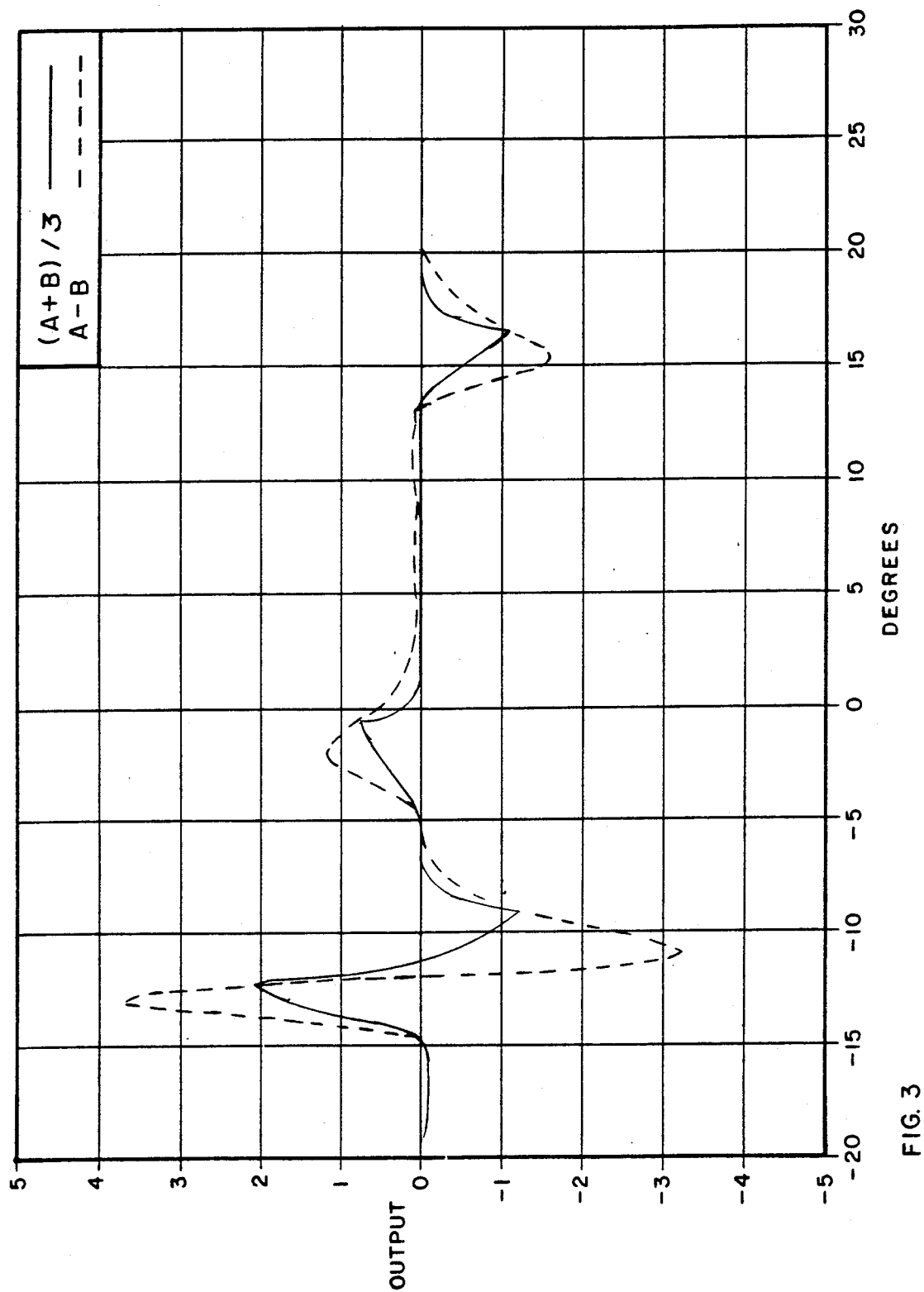
FIG. 3 is a graph of detector signals (A−B) and (A+B)/3 illustrating the processing logic in accordance with the present invention.

FIG. 1 illustrates an embodiment of an HCI processing circuitry in accordance with the present invention. This concept is applicable to other types of horizon sensors as will be explained hereinafter. An infrared detector, referred to generally with the reference numeral 10, comprises two elements A and B which define two fields of view, for example, 1.5°×1.5° fields closely adjacent to each other. The infrared detector is characterized by being sensitive to infrared radiation in the 14–16 micrometer carbon dioxide band and may comprise two pyroelectric detector flakes A and B, but other detectors could be utilized in other implementations, for example, thermistor bolometer flakes, thermopiles for slow scan rates, etc. The size of the detector fields are small. As the detector 10 is scanned as the satellite on which the detector 10 is mounted spins around its axis, while it orbits the earth, radiation applied to the detector 10 produces signals on detectors A and B which are amplified by preamplifiers 12 and 14, respectively and applied through limiters 13 and 16, respectively. The preamplifiers are wide band preamps with a treble boost and detector compensation to accommodate the use of pyroelectric flakes. The signals obtained after amplication in the preamps 12 and 14 are shown in FIG. 2 which are typical waveforms for a January earth horizon profile for an HCI. In the 14–16 micrometers spectral band pass region, the carbon dioxide band, the sun signal is approximately forty times the minimum earth's signal. The preamplifiers 12 and 14 compensate for the frequency response of the pyroelectric detector so the wave forms represent the equivalent radiance wave forms which would be the case for a wide band width detector and preamp.

It should be noted in FIG. 2 that there are radiance differences between the leading and trailing edges of the earth (A) and earth (B) signals which normally cause horizon sensor errors. The solid waveform shown in FIG. 2 which is the sun and earth (A) signals generated by the detector A and the dotted waveform earth (B) is the detector B signal indicating that during the scan detector A scans the sun and the earth first followed by detector B indicating that the signal from detector A is leading the signal from the detector B. Signal A from detector A is applied through the preamplifier 14 to the limiter 16, and then to a combiner circuit 18. Signal B from detector B is applied through preamplifier 12 through a limiter 13 to a combiner 20 where it is inverted and combined with signal A to provide an output of (A−B) which is applied through a low pass filter 22 and through a low threshold (either plus or minus) through a plus amplifier 26 and into comparator 28. Signal A is also combined with signal B in combiner circuit 18 and divided by two by divider 19 where it is applied through a low pass filter 21 having an output of (A +B)/3. The output of low pass filter 21 is applied through a capacitor 23 of a variable differentiator circuit, referred to generally with the reference numeral 25. The output of the variable differentiator circuit, 25 is applied through a gated amplifier 30 through amplifier 39 to comparator 28. The output of the gated amplifier 30 with a negative output is applied through amplifier 31 to comparator 32. A negative low threshold signal from low threshold circuit 24 is applied through amplifier 33 to the comparator 32. The output of the comparator 28 which represents the leading edge (LE) of the horizon crossing earth pulse is applied to the set terminal 34 of a set-reset flip-flop 35. The output of comparator 32 which represents the trailing edge (TE) of the horizon crossing pulse is applied to the reset input 36 of the set-reset flip-flop 35 with the output 37 of the set-reset flip-flop 35 representing the earth pulse generated by the HCI. The outputs of comparators 28 and 32 are also applied to an OR gate 38 along with the output of a comparator 40 which compares the output of the (A−B) signal from the low threshold circuit 24 with the output of the variable differentiator 25 namely, the (A+B)/3 signal. The output of the OR gate 38 is applied to the set terminal 42 of the set-reset flip-flop 44. The output of the low threshold circuit 24 is also provided through an amplifier 45 to the reset input 43 of the set-reset flip-flop 44. The output of the set-reset flip-flop 44 is applied through a field effects transistor (FET) 46 to a voltage divider 27 which comprises an element of the variable differentiator 25.

The output 37 from the set-reset flip-flop 35 is also applied through an amplifier 47, a flip-flop 48, a Miller integrator 49, a peak detector 50, and a amplifier 51 which is coupled to a variable monostable multivibrator 52. The multivibrator 52 will be utilized in order to handle variable spin rates for the HCI. The multivibrator 52 is coupled to the low threshold circuit 24 and has an output which is coupled to the gated amplifier 30.

In accordance with the present invention, the horizon is detected when an absolute threshold is exceeded where the absolute value of (A−B) is less than the absolute value of (A+B)/3. Since the radiance amplitude of each horizon edge affects both the (A−B) and (A+B) signals, the horizon indication at (A−B)−(A+B)/3 is essentially independent of the radiance variations of the earth in the 14–16 micrometer atmospheric $CO_2$ absorption band.

Illustrative of the implementation of this (A−B)−(A+B)/3 threshold is illustrated in FIG. 1 in which low threshold signals from the threshold circuit 21 which are the (A−B) signals are applied along with the (A+B)/3 signals from the gated amplifier 30 to the comparator 28 which sets the leading edge (LE) of the earth signal on the set-reset flip-flop 35. The trailing edge (TE) is set by the application of the same signals to the comparator 32 to reset the set-reset flip-flop 35 producing the output 37.

In addition, several other functions are performed by the circuitry of FIG. 1. Two different band widths are used for the (A+B)/3 signal. A wide band width whose lower limit approaches DC is used between the time that a signal is sensed by the low threshold 24 and any time at which the absolute value of (A−B) is less than the absolute value of (A+B)/3 which is determined by the comparator 40 whose output is applied to the OR gate 38 along with the outputs of comparators 28 and 32. Accordingly, when (A+B)/3. is greater than (A−B), the leading edge (LE) of the horizon pulse sets the flip-flop 35 as well as the flip-flop 44. The FET 46 is shorted which provides a hard differentiation for the variable differentiator 25. When the (A−B) signal begins to go minus, the flip-flop 44 is reset to stop the differentiating action of variable differentiator 25. Thus, the variable differentiator 25 provides a high pass network which is increased to produce stronger differentiation action when (A−B) is greater than (A +B)/3. This accomplished within the time between the occurrence of the condition when (A−B) is less than (A+B)/3 until the time the low threshold is again exceeded by either a negative or a positive signal.

An additional function of the circuits shown in FIG. 1 is to eliminate the effect of the sun and moon based on their smaller pulse width in comparison to the earth when either the sun or moon is greater than 3° from the earth's leading or trailing horizon edge. FIG. 4 is a table which illustrates the time difference between the pulse initiation to the threshold transition region of the sun or the moon relative that of the earth as applied to the wave forms shown in FIG. 2. As can be seen from this table, the sun or moon always produces a smaller angular difference between the pulse initiation and the $(A-B)-(A+B)/3$ threshold than does the rising earth or the falling earth. The sun or moon can then be eliminated without the requirement of an additional sun or moon detector by utilizing the variable monostable multivibrator 52 of FIG. 1, which ignores $(A-B)-(A+B)/3$ transitions that occur at less than a certain fixed amount after the initiation of any pulse. The negative $(A-B)-(A+B)/3$ transition, which could occur when the sun or moon is present, is eliminated by using a gated amplifier 30 which starts on a positive threshold only and resets the flip-flop 44 when $(A-B)$ goes negative. The comparator 30 prevents locking on the sun or the moon if there is no earth signal present. The circuitry ignores a second erroneous trailing edge which could be produced by the sun and the moon.

When the HCI has a variable spin rate, the sun gate monostable multivibrator 52 has its multiple period adjusted directly proportional to the inverse of the spin rate using the Miller integrator 49, peak detector 50, and an isolating opamplifier 51 which circuit is set and reset by the flip-flop 48 in accordance with the leading edge of the output signal 37. This effectively eliminates the speed of the scan with respect to radiation variation on the scanned earth. An alternative approach could be to use a digital counter and a digital to analog converter for the Miller integrator and peak detector shown. The adjustable rate is based on the RPM of the HCI with a slower speed producing a longer time period for the monostable multivibrator 52. Thus, the higher the RPM, the shorter the time constant and the slower the RPM, the longer the period of the multivibrator.

In an illustrative embodiment aside from the elimination of a sun detector, with HCI operating at 400 kilometers at a spin rate of 10 RPM, the worst case error in phase is less than 0.02° with a less than 0.03° chord width error.

If a rotating scanner is mounted on the satellite, another implementation using a single infrared detector is used. An example of such horizon sensor is shown and described in U.S. Pat. No. 3,020,407 which is a conical scan horizon sensor having a rotating optical assembly which scans a conical trajectory across the earth's horizon and applies the radiation received from a field of view to the infrared detector. This type of scanner could not be used in a twin field sensor because in certain optical embodiments at certain positions of the scan, the scanning of the two fields over the earth's horizon would not cross the horizon sequentially. Accordingly, in the second embodiment of the present invention, a single infrared detector is utilized and the detector signal is processed by a digitizer whose digital output is stored in memory and reread time delayed for a period equivalent to one field of view angular traverse in space. This approach would be used with a constant speed conical scanner and the relationship described in connection with FIG. 1 would be maintained utilizing a digitized storage and a digitized time delay storage signal to achieve the same function as that described in connection with FIG. 1. In such an embodiment, a single pyroelectric or other detector element is used. The single detector signal is amplified and digitized at 0.36° intervals creating two windows which are composed of eight (8) samples wide and are comprised of the last sixteen (16) samples. These windows and samples are taken only on the leading and trailing edge of the earth's pulse and are known as the COBE sensor digital signal processing system. Using the time delay allowed by the digitized processing will inherently produce signals required by the $(A-B)-(A+B)/3$ function which is described in connection with FIG. 1. All of the hardware functions described in FIG. 1 can be implemented in software by utilizing the storage and delay of the digital footprint of the earth pulse used in COBE type processing.

Accordingly, a very broad processing technique is provided for accurately locating the horizon from an orbiting satellite or space craft. The location of the horizon by this process is independent of the speed of scan of the sensor mounted on the satellite and is independent of the radiance variations of the earth producing a sensor of high accuracy. In addition, the method included is applicable to both HCI as well as constant speed scanners mounted on a satellite whose orientation is desired to be determined with respect to the earth. In addition, the sun and moon are eliminated without utilizing separate detectors and associated circuitry for sun or moon elimination.

Since other changes and modifications vary to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:
1. A method of compensating for radiance variations on the earth scanned by a horizon sensor for identifying the earth's horizon comprising the steps of scanning the earth's horizon with:
   generating first (A) and second (B) signals of finite pulse width representing radiation from two closely adjacent fields of view of infrared detector means on crossings of the earth's horizon;
   deriving $(A-B)$ and $(A+B)/3$ signals from said first (A) and second (B) signals;
   detecting the horizon when a threshold is exceeded when the $(A-B)$ signal is less than the $(A+B)/3$ signal whereby the detected horizon is essentially independent of the radiance variations of the earth's horizon.
2. The method as claimed in claim 1 including the step of:
   eliminating signals generated by the sun and moon appearing in the field of view based on the smaller pulse width of such signals in comparison with the finite pulse width of said first (A) and second (B) signals.
3. The method as claimed in claim 1 wherein the step of generating said first (A) and second (B) signals comprises generating said first (A) and second (B) signals by scanning two fields of views of said infrared detector means across said horizon.
4. The method as claimed in claim 1 wherein the step of generating said first (A) and second (B) signals comprises generating said first (A) signal from scanning said infrared detector means across said horizon, digitizing and storing said first (A) signal in a memory, time delaying said first (A) signal and re-reading the stored signal for a time period equivalent to one field-of-view angular traverse in space for forming said second (B) signal.

5. The method of claim 1 wherein the step of scanning the earth's horizon is provided by the spinning motion of a satellite containing said horizon sensor while the satellite is orbiting the earth;

adjusting said first (A) and second (B) signals by an adjustment directly proportional to the inverse of the spin rate of said satellite.

6. A horizon sensor which compensates for radiance variations on the earth independent of speed of scan comprising:

infrared detector means sensitive to radiation in the 14–16 micrometer band which is scanned across outer space and the earth's horizon, first means coupled to said infrared detector means for providing first (A) and second (B) signals representing radiation from two closely adjacent fields of view on scanning the earth's horizon;

second means coupled to said first means for providing a (A−B) signal and a (A+B)/3 signal from said first (A) and second (B) signals, comparator means coupled to said second means for producing an output signal representing the horizon crossings when the (A−B) signal is less than (A+B)/3 signal.

7. The horizon sensor as claimed in claim 6 having a third means coupled between said second means and said comparator means for eliminating any sun signals from radiation received by said infrared detector means based on the smaller pulse width a sun signal as compared with the first (a) signal and second (B) signals.

8. The horizon sensor as claimed in claim 7 wherein said third means includes a gated amplifier.

9. The horizon sensor as claimed in claim 7 having a variable monostable multivibrator coupled between said output and the input of said comparator means having a variable period which is directly proportional to the inverse of the spin rate of a satellite on which the horizon sensor is positioned.

* * * * *